Dec. 3, 1957  R. A. CROSSLEY  2,814,966
STEREO VIEWER
Filed March 18, 1954
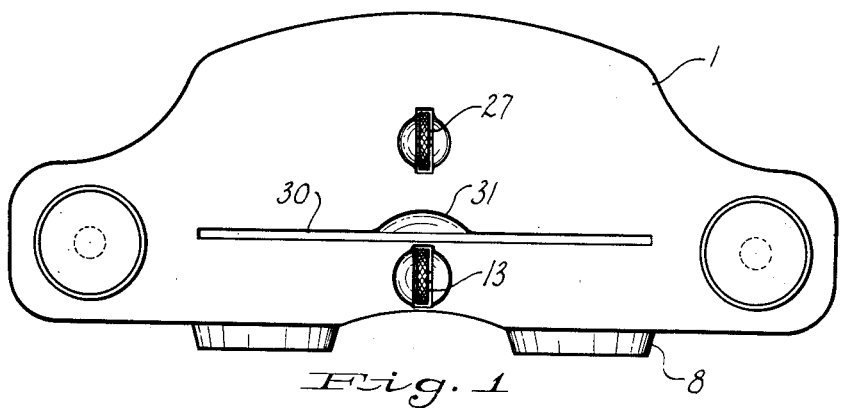
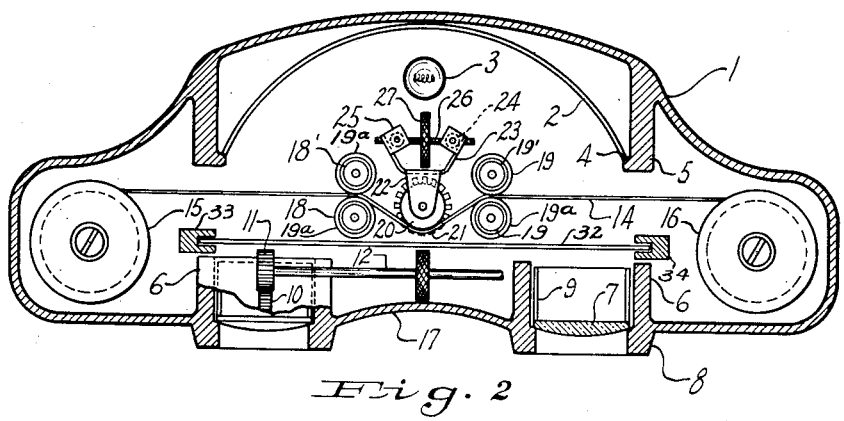
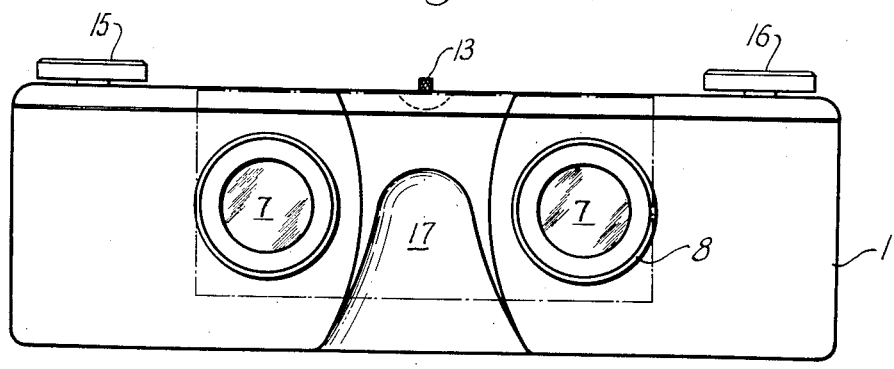
INVENTOR.
Richard A. Crossley
BY William B. Jaspert
Attorney.

2,814,966

STEREO VIEWER

Richard A. Crossley, Fort Lauderdale, Fla.

Application March 18, 1954, Serial No. 417,052

1 Claim.  (Cl. 88—31)

This invention relates to new and useful improvements in viewers and/or projectors for stereo pictures such as are taken by the "Realist" cameras, and it is among the objects thereof to provide a viewer and/or projector in which rolls of film may be viewed by unwinding them from a spool across an illuminated screen or projecting screen and rewinding them on a spool for storage or future use.

It is another object of this invention to provide a viewer and/or projector for viewing continuous film in roll form with means for adjusting the eye pieces or lenses to the film and for adjusting the film relative to the lenses by simple accessible means, to thereby view the film exactly as it was exposed in the camera.

It is a further object of the invention to provide a stereo viewer of simple, compact, light weight and durable construction that is not tiring to the user to hold while using and to incorporate the principles of such a viewer into a like projector to throw pictures in third dimension on to a wall screen.

These and other objects of the invention will become apparent from a consideration of the accompanying drawing constituting a part hereof in which like reference characters designate like parts and in which:

Fig. 1 is a top plan view of a stereo viewer embodying the principles of this invention;

Fig. 2 is a top plan view of the viewer with the cover removed; and

Fig. 3 is a front elevational view thereof.

With reference to the several figures of the drawing the numeral 1 generally designates a light weight case which may be made of plastic, aluminum, Dowmetal, or other light weight materials that will not tire the user when holding it to the eyes. As shown in Fig. 2, the case has a bowl shaped rear portion designated by the numeral 2 and constitutes the screen which is preferably white to reflect light supplied by a bulb 3, the screen 2 being supported on shoulders 4 of the lugs 5 that extend inwardly from the camera frame 1.

The rear of the frame is provided with annular ribs 6 for mounting lenses 7 and the wall of the case is projected at 8 to form eye guards. The lenses are mounted in ferrules 9 that are provided with a rack 10 having teeth intermeshing with tooth wheels 11 on a shaft 12 that is actuated by a knurled wheel 13 that extends through the top of the camera as shown in Fig. 1 or which may be provided with teeth for interacting with the teeth of a wheel 13 extending above the top wall of the camera. By rotating the wheel 13 the ferrules 9 are subjected to axial movement to adjust the position of the lenses 7 relative to the film 14 which is carried by spools 15 and 16.

The rear of the viewer is recessed at 17 to provide clearance for the nose and the viewer is provided with the curved faces that terminate into the extending portions that receive the spools 15 and 16 to provide an easy and firm grip of the viewer when in use.

The film 14 passes between pairs of rollers 18, 18′ and 19, 19′ which may be surfaced with a cloth material 19a such as velvet to clean off the lint from the film as it passes from one spool or roll to the other; the cloth rolls could also be treated as with Polorium to produce static to pick up lint and keep film clean in viewing. The members 18 and 19 also functioning as guide rolls by means of which a tension may be applied to the film 14 through a mechanism that consists of a wheel 20 having teeth 21 corresponding to the perforations in the film 14 to maintain a centered relation of the film with the lenses 7. The wheel 21 is mounted in a bracket 22 having ears 23 that carry screw threaded items 24 that are journalled in ears 25. The screw items 24 interacting with the right and left hand threads have a screw 26 that is rotated by a knurled wheel 27 projecting through the top wall of the camera as shown in Fig. 1.

By rotating the wheel 27 the ears 23 of the bracket 22 are contracted or extended to effect the corresponding movement of the wheel 20 that acts against the face of the film 14.

Such movement will adjust the spacing of the two frames of the picture relative to each other and to the lenses 7 to bring them into focus in the exact manner as they were exposed in the cameras, this being an important feature of this invention.

In the use of the stereo viewer the full roll of film or several rolls of such film spliced into a single strip of film may be inserted in the viewer and the film is then laced between the guide pulleys 18 and 19 and the wheel 20 in the manner shown in Fig. 2 to extend to the other spool to which it is secured in the usual manner as by a spring clip. The film is then ready for viewing and the viewer will adjust distance of the lens to the film by rotating wheel 13 to adjust the distance to his eyes. By adjusting the hand wheel 27 the frames corresponding to a single picture may be adjusted relative to each other to bring the film in sharp focus through the lenses 7 and once this adjustment has been made the viewer simply revolves the spool that will move the film across the lenses through the light reflected by the screen 2 as it is illuminated through the bulb 3. The light is preferably supplied by 110 volt circuit so that the use of batteries will be unnecessary.

After all of the film has been moved and gathered on the receiving roll or spool, it is removed and stored or it may be again viewed by moving it through the viewer in the opposite direction.

By means of a slot 30 recessed at 31 slides 32 may be viewed instead of roll film. In such use, the slides would be dropped between the guides 33 and 34 behind the lenses and no film would be loaded in the viewer.

It is evident that by means of the above described apparatus stereo films may be conveniently viewed without the need for mounting them in frames and without the annoyance of replacing each individual frame in a viewer. It is also evident that the apparatus can be made in compact form perhaps of like or similar dimensions as the well known Realistic camera and its light weight and adjustability is intended to facilitate the use of stereo type film. The same construction of film roll mount with spring adjustment and lense adjustment may be employed to project the images on screens.

Although one embodiment of the invention has been herein illustrated and described, it will be evident to those skilled in the art that various modifications may be made in the details of construction without departing from the principles herein set forth.

I claim:

In a stereoscopic viewer for use with film strip having pairs of identical images spaced apart a fixed distance on the film strip for showing successive spaced pairs thereof, a case with extended end portions to receive a pair of oppositely disposed spools, a pair of viewing lenses having their optical axes at substantially interpupillary spacing, a separate guide means in alignment with each of said spools to clean and also guide a film strip in a path transverse to said optic axes as it passes from one of said oppositely disposed rolls to the other, an adjusting sprocket wheel to engage holes in the film strip which is adapted to be displaced transversely to the path of said strip, said adjusting sprocket wheel being mounted in a bracket having a pair of spaced apart adjusting ears having bores respectively with internal right and left hand threads so that the bores may interact with an axial right and left hand threaded screw extending therethrough, said screw having a knurled wheel in the central portion to rotate the screw whereby the ears may be moved to displace the sprocket and mounting bracket transversely to the path of the strip to center the pairs of images in exact alignment with the optic axes of the pair of viewing lenses so that it is viewed exactly as the film was exposed in the camera.

References Cited in the file of this patent

UNITED STATES PATENTS

| | | |
|---|---|---|
| 824,266 | Todd | June 26, 1906 |
| 1,237,047 | Howell | Aug. 14, 1917 |
| 1,239,295 | Noble | Sept. 4, 1917 |
| 1,498,435 | Bouin | June 17, 1924 |
| 1,515,429 | Bouin | Nov. 11, 1924 |
| 1,808,176 | Pieper et al. | June 2, 1931 |
| 2,006,914 | Fayolle | July 2, 1935 |
| 2,033,902 | Albada | Mar. 10, 1936 |
| 2,207,483 | Hennicke et al. | July 9, 1940 |
| 2,351,371 | Smith | June 13, 1944 |
| 2,478,556 | Avers et al. | Aug. 2, 1947 |
| 2,666,360 | Collins | Jan. 19, 1954 |

FOREIGN PATENTS

| | | |
|---|---|---|
| 760,590 | France | Dec. 14, 1933 |
| 819,581 | Germany | Nov. 5, 1951 |